United States Patent [19]
Lan

[11] Patent Number: 5,228,223
[45] Date of Patent: Jul. 20, 1993

[54] LICENSE PLATE FOR MALAYSIAN MOTORCYCLE

[76] Inventor: Ching-Hwei Lan, No. 9, Alley 1, Lane 458, Yuang Ho Rd., Chung Ho City, Taiwan

[21] Appl. No.: 828,041

[22] Filed: Jan. 30, 1992

[51] Int. Cl.$^5$ ............................................... G09F 13/02
[52] U.S. Cl. ....................................... 40/204; 40/205; 40/546; 362/31
[58] Field of Search ................ 40/204, 205, 206, 546, 40/556, 572, 574, 575, 578, 579; 362/31, 72, 83.2, 311, 339

[56] References Cited

U.S. PATENT DOCUMENTS

| | | | |
|---|---|---|---|
| 1,647,090 | 10/1927 | Globus | 40/579 X |
| 1,664,302 | 3/1928 | Leopold et al. | 40/205 |
| 1,672,565 | 6/1928 | Giordano | 40/205 |
| 4,272,901 | 6/1981 | Matthews | 40/574 |
| 4,373,284 | 2/1983 | Crane | 40/578 X |
| 4,811,507 | 3/1989 | Blanchet | 40/546 |
| 4,858,081 | 8/1989 | James | 362/72 |
| 5,075,826 | 12/1991 | Lan | 40/546 X |
| 5,079,675 | 1/1992 | Nakayama | 362/31 |

FOREIGN PATENT DOCUMENTS

| | | | |
|---|---|---|---|
| 187441 | 12/1955 | Austria | 40/206 |
| 623729 | 12/1935 | Fed. Rep. of Germany | 40/204 |
| 744916 | 4/1933 | France | 40/206 |

*Primary Examiner*—Kenneth J. Dorner
*Assistant Examiner*—J. Bonifanti
*Attorney, Agent, or Firm*—Browdy and Neimark

[57] ABSTRACT

A license plate for Malaysian motorcycle, comprising a main body connected by two light-piercing boards together in a symmetric way, each with a full covering of 45° prisms in more than one flight of stages on the back side; an opaque, white ground plate clamped therebetween; an opaque, blank vacant number plate connected to the main body front side respectively; a transparent waterproof hood enclosing them all, and a PC board which includes a plurality of small bulbs on it connected in a seat body for the main body. Upon energization of PC board, a license plate number in black-ground-white-letter style on either side of the license plate will be illuminated greatly and in even brightness.

3 Claims, 2 Drawing Sheets

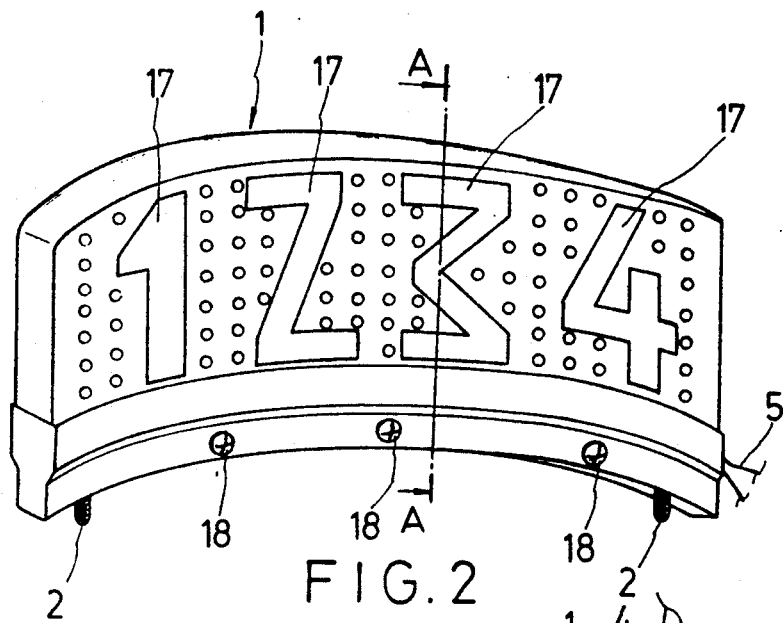
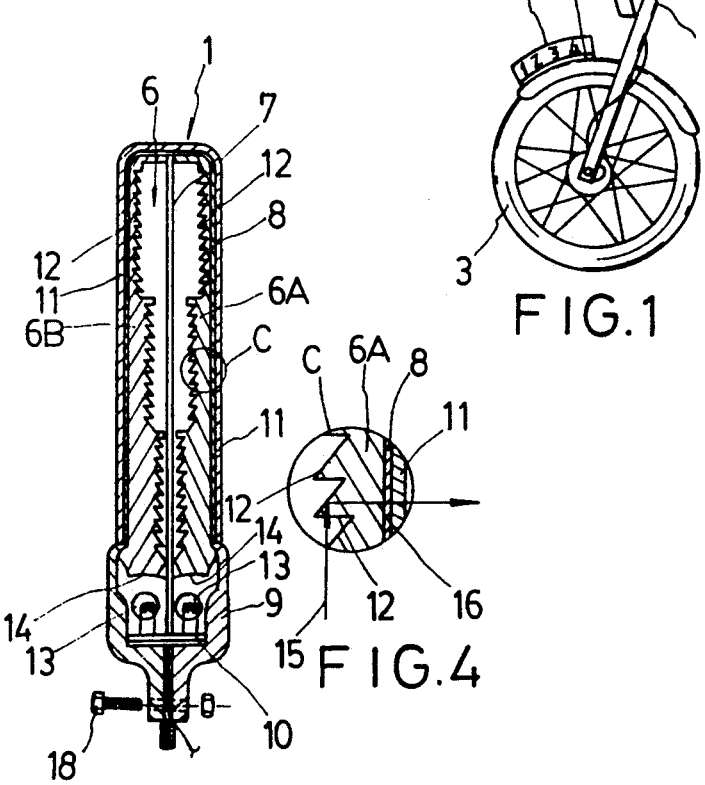

LICENSE PLATE FOR MALAYSIAN MOTORCYCLE

FIELD OF THE INVENTION

The present invention relates to the license plate of motorcycle, and particularly for use on motorcycles in the country of Malaysia, in accordance with a regulation of the Malaysia's traffic authorities.

BACKGROUND OF THE INVENTION

The law in Malaysia requires a standard license plate which displays the government's granted license plate number on two sides of a plate mounted on the fender of the front wheel of the motorcycle. The license plate number is required to be white on a black background. In this way the license plate number can be clearly seen from either side of the plate in the daytime. However, such a plate is difficult to to see clearly in the night with just a marginal illumination from the front lamp of the motorcycle.

OBJECTIVE OF THE INVENTION

In order to solve the above-mentioned problem, the present invention provides a new kind of a license plate for use in Malaysia. A primary objective of the invention is to reflect an internally generated light out of the front side of a light-piercing main body so that, the license plate number on the main body is greatly illuminated.

SUMMARY OF THE INVENTION

The new license plate includes a main body comprising two symmetrical light-piercing boards, each having a full covering of 45° prisms in more than-one flight of stages on their back sides, a white ground plate clamped therebetween, an opaque, black vacant number plate connected to each front side the main body, a transparent waterproof hood enclosing the main body, and a PC board placed in a seat body for the main body. Once energized, a license plate number cut out of the black background of the plate would be evenly brightened on either side of the license plate as a white number.

BRIEF DESCRIPTION OF THE DRAWING

FIG. 1 shows the assembly position of the invention on a front wheel motorcycle;

FIG. 2 is an enlarged view of the invention shown in FIG. 1;

FIG. 3 is a sectional view taken along the A—A line in FIG. 2;

FIG. 4 is an enlarged view of the C part in FIG. 3; and

SPECIFIC DESCRIPTION

Figure 5:
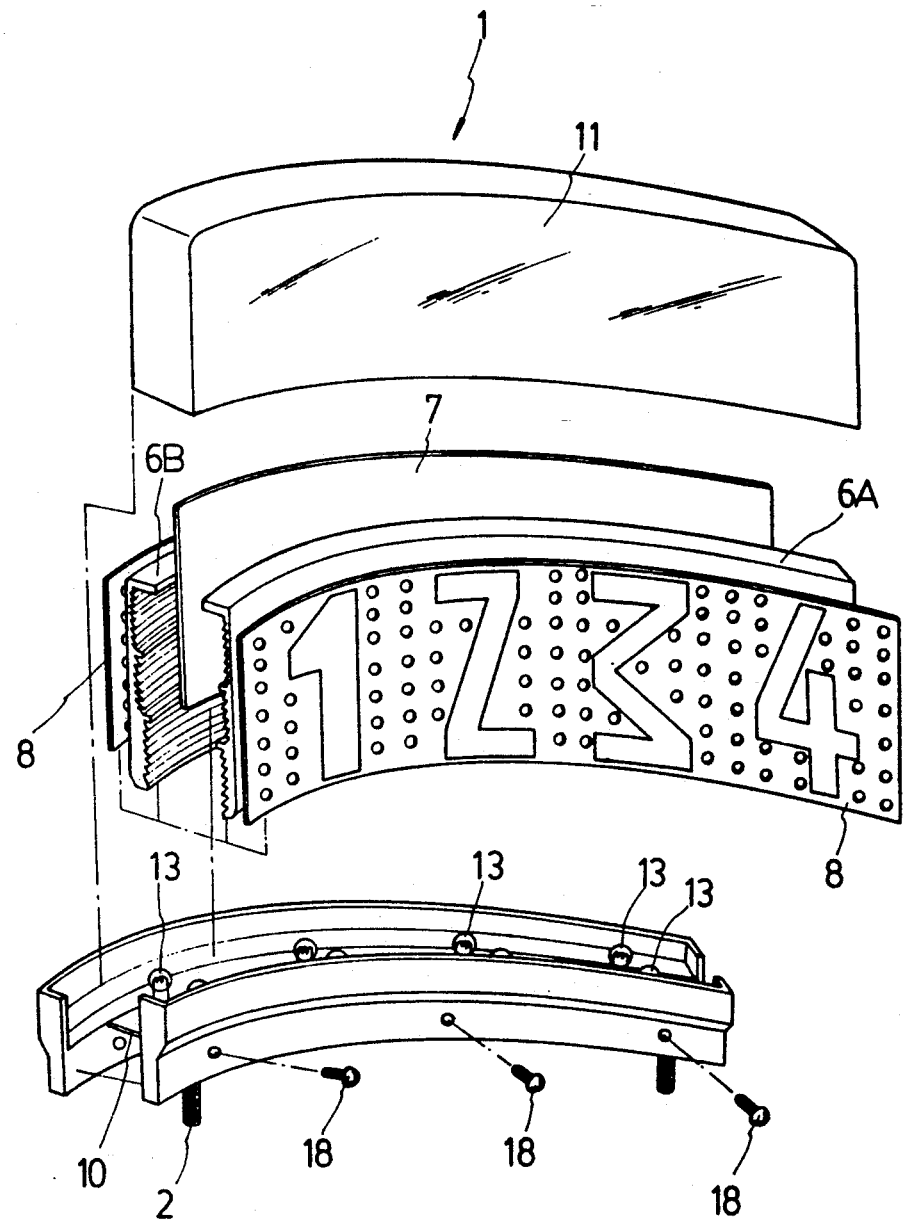
FIG. 5 is an exploded view of the invention shown in FIG. 2.

As FIGS. 1, 2 show, the inventive license plate 1 is assembled on the fender 4 of the front wheel 3 of the motorcycle in a lengthwise direction by means of screw bolts 2 used at license plate lower end. It has a connection established with the illumination circuit (not shown) of the motorcycle via power lead 5 and uses the original power source of it.

As FIGS. 3 and 5 show, license plate 1 is made up by a main body 6, a white ground plate 7, two black vacant number plates 8, a seat body 9, a PC board 10 and a waterproof hood 11. Wherein, main body 6 symmetrical light-piercing boards 6A and 6B arranged in a back-against-back manner. The light-piercing boards 6A/6B each have a plane front side and a back side fully covered with 45° prisms 12 in more than one flight of stages. Along the lower edge of light-piercing boards 6A/6B is a concavely arcuate face 14 created with the same radius as the casings of small bulbs 13. Thus light emitted from bulbs 13 travels into light-piercing boards 6A/6B in the direction of arrow 15 shown in FIG. 4. When running into each 45° slant of the 45° prism 12, the the light is deflected in a direction of arrow 16 shown in FIG. 4. The internal total reflection of light is thereafter projected out from the main body front side, passing the cut-out number 17 of black vacant number plate 8 (as FIG. 2 shows).

As FIGS. 3 and 5 show, white ground plate 7 is an opaque, white thin plate which in both shape and dimension corresponds to main body 6 and is clamped between light-piercing boards 6A and 6B. White ground plate 7 acts with black vacant number plate 8 by displaying the cut-out license plate number 17 as a white-letter against the black background of plate 8. As FIG. 5 shows, black vacant number plate 8 is two in number, and each is an opaque, black vacant thin plate which in both shape and dimension corresponds to the light-piercing board front side and is connected thereto respectively. In black vacant number plate 8, there is a honeycomb spread of holes to facilitate cutting out number 17 from it with ease. Black vacant number plates 8 together with the other elements are all enclosed in a transparent waterproof hood 11 corresponding in shape and dimension. A seat body 9 is two half bodies mounted together in a clamped way at the end of main body 6 by means of screw bolt 18. In a reserved room in the middle of seat body 9 is connected a PC board 10, on which are connected two rows of small bulbs 13 equally distant from each other and put right against the concavely arcuate face 14 of light-piercing boards 6A and 6B respectively. In this way the the light emitted from small bulbs 13 may fully enter light-piercing boards 6A and 6B. A power lead 5 is used to connect with the illumination circuit of the motorcycle. As the front big lamp of motorcycle is turned on, therefore, license plate number 17 in black-ground-white-letter style on either side of the license plate will be clearly illuminated as a result of lights' internal total reflection.

I claim:

1. A license plate for use on a fender of a motorcycle, said license plate comprising:

a main body having two symmetrical transparent boards with a back side of each of said transparent boards facing each other;

said each of said transparent boards having a plane front side;

said back side of said each of said transparent boards having a plurality of 45° prisms thereon;

an opaque white background plate clamped between said transparent boards;

an opaque black number plate engaged to said front side of said each of said transparent boards;

each said opaque black number plate having a plurality of holes to facilitate cut out of license plate numbers;

a transparent waterproof hood engaged over said main body;

a PC board having two rows of light bulbs;

said PC board engaged in a seat body mounted at a lower end of said main body;

wherein, light emitted by said light bulbs travels in said each of said transparent boards until reflected out said front side by said 45° prisms through cut out numbers in said opaque black number plate.

2. The license plate according to claim 1, wherein said each of said transparent boards has a lower edge with a concave arcuate face having the same radian as a casing of said light bulbs.

3. The license plate according to claim 1, wherein groups of said 45° prisms are respectively arranged in a plurality of planes parallel to said front side of said each of said transparent boards.

* * * * *